United States Patent
Naoe

(10) Patent No.: US 8,964,134 B2
(45) Date of Patent: Feb. 24, 2015

(54) LIQUID CRYSTAL DISPLAY DEVICE

(71) Applicant: Yasuo Naoe, Ishikawa-ken (JP)

(72) Inventor: Yasuo Naoe, Ishikawa-ken (JP)

(73) Assignee: Japan Display Inc., Tokyo (JP)

( * ) Notice: Subject to any disclaimer, the term of this patent is extended or adjusted under 35 U.S.C. 154(b) by 94 days.

(21) Appl. No.: 13/777,027

(22) Filed: Feb. 26, 2013

(65) Prior Publication Data

US 2013/0242217 A1  Sep. 19, 2013

(30) Foreign Application Priority Data

Mar. 16, 2012  (JP) .................. 2012-061143

(51) Int. Cl.
| | |
|---|---|
| *G02F 1/1343* | (2006.01) |
| *G02F 1/1333* | (2006.01) |
| *G06F 3/041* | (2006.01) |
| *G02F 1/1362* | (2006.01) |

(52) U.S. Cl.
CPC ........ *G02F 1/13439* (2013.01); *G02F 1/13338* (2013.01); *G06F 3/0412* (2013.01); *G02F 2001/13629* (2013.01)
USPC .......... 349/12; 349/147; 345/174; 178/18.06; 438/30

(58) Field of Classification Search
USPC ............................ 349/12, 147; 345/173–178; 178/18.06–18.07; 438/30
See application file for complete search history.

(56) References Cited

U.S. PATENT DOCUMENTS

| | | | |
|---|---|---|---|
| 8,217,913 B2 | 7/2012 | Hotelling et al. | |
| 2011/0210935 A1* | 9/2011 | Chuang .................. | 345/174 |
| 2013/0161703 A1* | 6/2013 | Lai et al. .................. | 257/254 |

FOREIGN PATENT DOCUMENTS

| | | |
|---|---|---|
| JP | H9-57892 | 3/1997 |
| JP | 2010-231773 | 10/2010 |
| JP | 2012-53594 | 3/2012 |

OTHER PUBLICATIONS

Office Action issued Nov. 28, 2014 to Japanese Patent Application No. 2012-061143, with English translation.

* cited by examiner

*Primary Examiner* — Michael Caley
(74) *Attorney, Agent, or Firm* — Oblon, Spivak, McClelland, Maier & Neustadt, L.L.P.

(57) ABSTRACT

In one embodiment, a liquid crystal display device includes an array substrate having a sensor electrode and a plurality of pixel electrodes, and a counter substrate facing the array substrate. The sensor electrode includes an electric conductive oxide layer, a first electric conductive layer arranged on the electric conductive oxide layer and formed of one metal selected from the group consisting of molybdenum (Mo), titanium (Ti), nickel (nickel), and chromium (Cr), and a second electric conductive layer arranged on the first electric conductive layer and formed of aluminum. The plurality of pixel electrodes is arranged on the sensor electrode in a matrix shape so as to face the electric conductive oxide layer. Each pixel electrode is provided with slits. The thickness of the first electric conductive layer is equal to or less than 10% of the thickness of the second electric conductive layer.

16 Claims, 3 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2012-061143 filed Mar. 16, 2012, the entire contents of which are incorporated herein by reference.

FIELD

Embodiments described herein relate generally to a liquid crystal display device.

BACKGROUND

In recent years, a flat panel display device is developed briskly. Especially, a liquid crystal display device is applied to various fields taking advantages such as light weight, thin shape, and low power consumption. The liquid crystal display device is constituted by holding a liquid crystal layer between a pair of substrates. The liquid crystal display device displays images by controlling modulation rate of light penetrating in the liquid crystal layer by electric field between a pixel electrode and a common electrode.

In the liquid crystal display device, two controlling systems are known. One system controls an alignment state of the liquid crystal layer by impressing vertical electric field to the liquid crystal layer in a direction perpendicularly crossing with surfaces of the pair of substrates. Another system controls the alignment state of the liquid crystal layer by impressing lateral electric field including Fringe Electric Field to the liquid crystal layer in a direction substantially in parallel with surfaces of the pair of substrates.

Especially, the liquid crystal display device using the lateral electric field attracts attention in the viewpoint of a wide viewing angle characteristics. The liquid crystal display device using lateral electric field such as IPS (In-Plane Switching) mode and FFS (Fringe Field Switching) mode is equipped with a pixel electrode and a common electrode formed in an array substrate, respectively. Liquid crystal molecules are switched by the lateral electric field substantially in parallel with the principal surface of the array substrate.

Further, a liquid crystal display device equipped with a contact sensor is proposed to detect that a user's finger or a nib contacts with the contact sensor. There are two types of structures of the contact sensor. One type is constituted by further stacking a sensor substrate equipped with a sensor electrode in a display area of the liquid crystal display device. Another type is constituted by integrally forming sensor electrodes with one of the pair of the substrates of the liquid crystal display device.

When forming an electrode and a wiring by stacking a plurality of electric conductive layers, if the stacked electric conductive layers are patterned by a wet etching process, each layer is unevenly removed. Accordingly, neither the end of the electrode nor the end of the wiring may become in a tapered shape.

For example, when the electric conductive layers are arranged on the wiring or the electrode through an insulating layer, if the electric conductive layer arranged in a lower layer is much removed than other electric conductive layers, a coverage characteristics of the electric conductive layer becomes worsen, and a short circuit is caused. Thereby, the manufacturing yield may be lowered.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
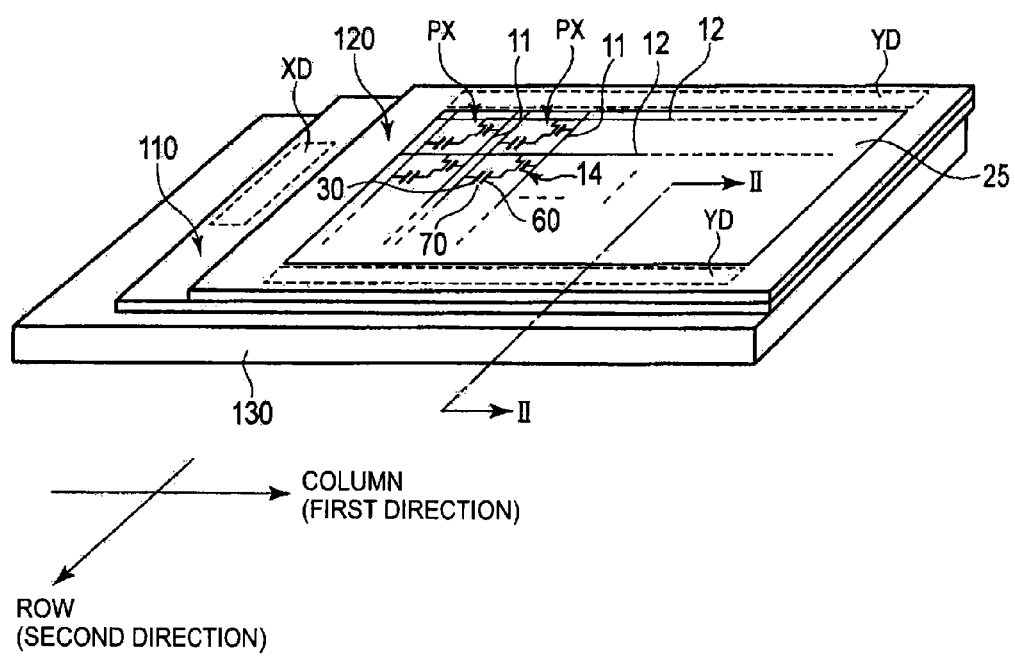
FIG. 1 is a figure schematically showing a structure of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: an array substrate including; a sensor electrode having an electric conductive oxide layer, a first electric conductive layer arranged on the electric conductive oxide layer and formed of one metal selected from the group consisting of molybdenum (Mo), titanium (Ti), nickel (nickel), and chromium (Cr), and a second electric conductive layer formed of aluminum, and a plurality of pixel electrodes arranged on the sensor electrode in a matrix shape so as to face the electric conductive oxide layer, each pixel electrode including slits, a counter substrate facing the array substrate; and a liquid crystal layer held between the array substrate and the counter substrate; wherein the thickness of the first electric conductive layer is equal to or less than 10% of the thickness of the second electric conductive layer.

According to other embodiment, a method of manufacturing an array substrate for a liquid crystal display device includes the steps: forming an electric conductive oxide layer on the array substrate; forming a first electric conductive layer on the electric conductive oxide layer, the first electric conductive layer formed of one metal selected from the group consisting of molybdenum (Mo), titanium (Ti), nickel (nickel), and chromium (Cr); forming a second electric conductive layer on the first electric conductive layer, the second electric conductive layer formed of aluminum; patterning the first and second electric conductive layers using a wet etching process, a stacked end of the patterned first and second electric conductive layers having a tapered portion; forming an insulating layer on the first and second electric conductive layers having the tapered portion; and forming a third electric conductive layer on the insulating layer; wherein the thickness of the first electric conductive layer is equal to or less than 10% of the thickness of the second electric conductive layer.

FIG. 1 is a figure schematically showing a structure of a liquid crystal display device according to one embodiment. The liquid crystal display device includes a liquid crystal display panel and a backlight unit 130.

The liquid crystal display panel is provided with an array substrate 110, a counter substrate 120 arranged facing the array substrate 110 with a predetermined gap, a liquid crystal layer 70 held between the array substrate 110 and the counter substrate 120, and a display area 25 including pixels PX arranged in the shape of a matrix.

The backlight unit 130 includes LEDs (light-emitting diode), for example, as a light source, and illuminates the liquid crystal display panel from the back side.

Figure 2:
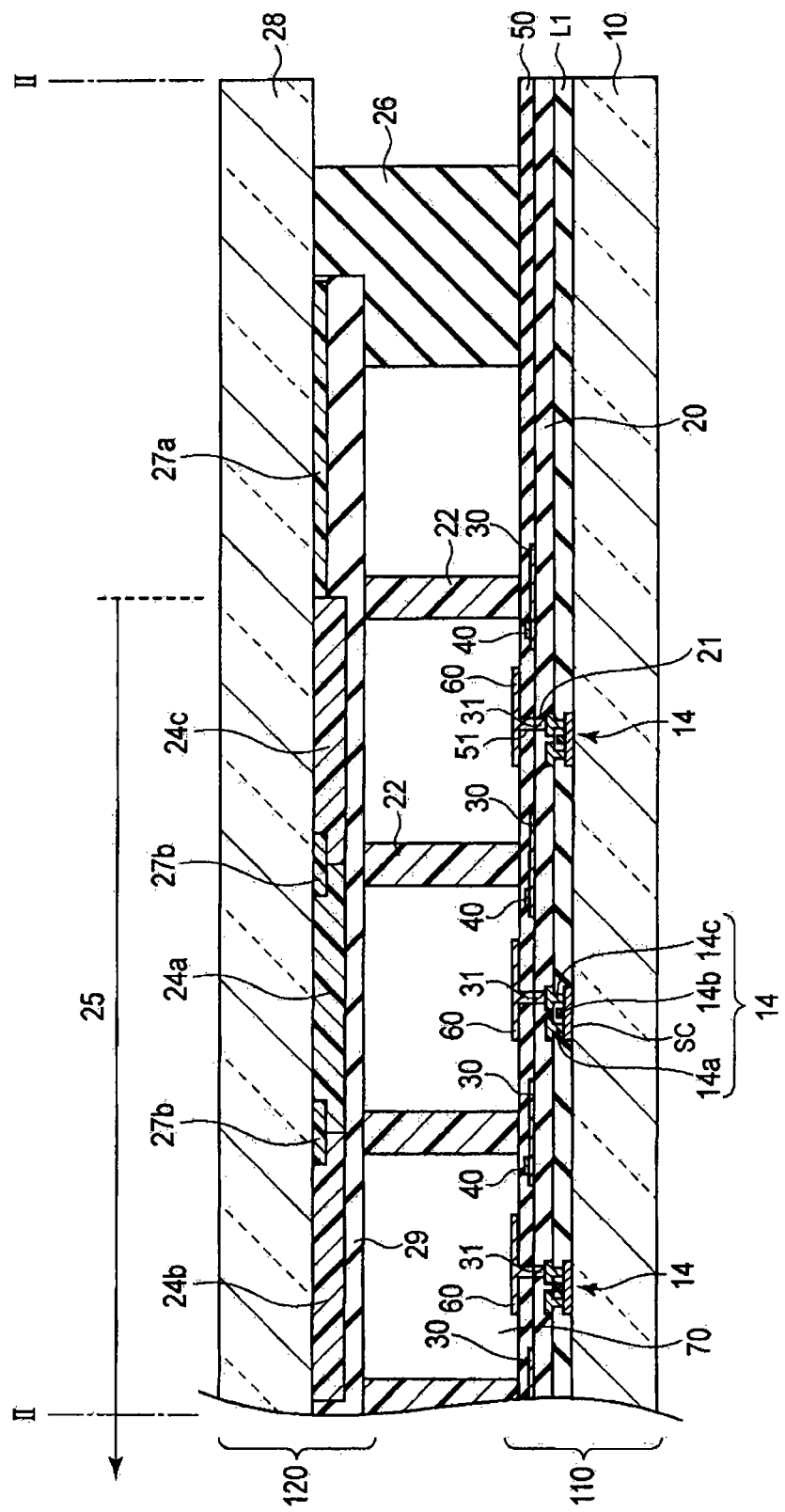
FIG. 2 is a cross-sectional view schematically showing the structure of the liquid crystal display panel taken along line II-II shown in FIG. 1.

The array substrate 110 includes a transparent insulating substrate 10 shown in FIG. 2 such as glass, a plurality of scanning lines 11, a plurality of signal lines 12 intersecting the plurality of scanning lines 11, a switching element 14 arranged near a position where the scanning line 11 and a signal line 12 cross, insulating layers L1 and 50 shown in FIG. 2, and a planarization layer 20 shown in FIG. 2, a pixel electrode 60 arranged in each of pixels PX, and a common electrode 30 which counters the plurality of pixel electrodes 60, a sensor electrode 40 arranged on the common electrode 30 shown in FIG. 2, an alignment layer which are not illustrated, and a driving circuit arranged in a frame area surrounding the display area 25.

The scanning lines 11 extend along with row lines of the pixels PX arranged in the shape of a matrix in the display area 25. The signal lines 12 extend along with column lines of the pixels PX arranged in the shape of a matrix in the display area 25.

In case of a color liquid crystal display device, each of pixels PX includes a plurality of kinds of color sub-pixels. According to this embodiment, when each of color pixels PX includes a red sub-pixel for displaying red, a green sub-pixel for displaying green, and a blue sub-pixel for displaying blue, for example. That is, one color pixel PX is constituted by three kinds of color sub-pixels of the red sub-pixel, the green sub-pixel, and the blue sub-pixel.

In the display area 25, the first color sub-pixel, the second color sub-pixel, and the third sub-color pixel are periodically arranged in a line in a direction in which the scanning line 11 extends. In a direction in which the signal line 12 extends, the color sub-pixels of the same kind are arranged in a line.

The driving circuit is provided with a scanning line driving circuit YD which drives the plurality of scanning lines 11, and a signal line driving circuit XD which drives the plurality of signal lines 12. The scanning line driving circuit YD is arranged on both sides of the display area 25 in the direction in which the scanning line 11 extends, for example, and the plurality of scanning lines 11 extending from the display area 25 is electrically connected with the scanning line driving circuit YD. The plurality of signal lines 12 extending from the display area 25 are electrically connected with the signal line driving circuit XD.

A flexible substrate which is not illustrated is connected with one end of the array substrate 110, and control signals and image signals are supplied to the scanning line driving circuit YD and the signal line driving circuit XD from a signal source which is not illustrated through the flexible substrate.

FIG. 2 is a cross-sectional view schematically showing the structure of the liquid crystal display panel taken along line II-II shown in FIG. 1. The liquid crystal display device according to this embodiment is the FFS mode type which controls the alignment state of the liquid crystal layer using the lateral electric field.

A switching element 14 is arranged near the position where the scanning line 11 and the signal line 12 cross. The switching element 14 is arranged on an undercoat layer (not shown) which is arranged on the transparent insulating substrate 10, and includes a thin film transistor equipped with a semiconductor layer SC of amorphous silicon or poly-silicon, a gate electrode 14b, a source electrode 14a, and a drain electrode 14c.

A gate insulating layer is arranged on the semiconductor layer SC of the switching element 14, and a gate electrode 14b of the switching element 14 is arranged on the gate insulating layer. In contact holes formed in the insulating layer L1, the source electrode 14a and the drain electrode 14c of the switching element 14 are respectively connected with the semiconductor layer SC.

The gate electrode 14b of the switching element 14 is electrically connected with a corresponding scanning line 11 (or integrally formed). The source electrode 14a of the switching element 14 is electrically connected with a corresponding signal line 12 (or integrally formed). The drain electrode 14c of the switching element 14 is electrically connected with the corresponding pixel electrode 60 in the contact holes 21 and 51 to be mentioned later.

When the scanning line 11 is driven by the scanning line driving circuit YD, and voltage is impressed to the gate electrode 14b of the switching element 11, the electric path between the source electrode 14a and the drain electrode 14c is made conductive, and the switching element 14 becomes in an ON state. The image signals are supplied to the pixel electrode 60 through the switching element 14 from the signal line 12 in the period when the switching element 14 is in the ON state.

A planarization layer 20 is arranged on the switching element 14. In this embodiment, the planarization layer 20 is formed of a transparent organic insulating layer, and the layer thickness thereof is substantially 3 μm. The planarization layer 20 is arranged over the whole display area 25 except for the contact hole 21. The contact hole 21 for electrically connecting the pixel electrode 60 with the drain electrode 14c which are mentioned later is formed in the planarization layer 20 on the drain electrode 14c of the switching element 14.

The common electrode 30 is arranged on the planarization layer 20. The common electrode 30 is formed of an oxide electric conductive layer formed of transparent electrode materials, such as ITO (Indium Tin Oxide) and IZO (Indium Zinc oxide). The common electrode 30 arranged at the end of display area 25 extends to a frame area, and common voltage is impressed to the common electrode 30 via the flexible substrate from the external signal source.

A connection electrode 31 is formed with the same material as the common electrode 30 in the contact hole 21. The drain electrode 14c of the switching element 14 and the connection electrode 31 are electrically connected in the contact hole 21.

The sensor electrode 40 is arranged on the common electrode 30 and electrically connected with the common electrode 30. The sensor electrode 40 is formed of a multilayer electrode of aluminum and molybdenum, for example. It is possible to use electric conductive materials, such as titanium (Ti), nickel (nickel), and chromium (Cr), as a material of the sensor electrode 40 in place of molybdenum.

An insulating layer 50 is arranged on the sensor electrode 40. The insulating layer 50 is formed on the connection electrode 31 and provided with a contact hole 51 for electrically connecting the pixel electrode 60 with the connection electrode 31.

On the insulating layer 50, the pixel electrode 60 is arranged and electrically connected with the connection electrode 31 in the contact hole 51. The pixel electrode 60 is formed, for example, of transparent electrode materials such as ITO and IZO. An alignment layer which is not illustrated is arranged on the pixel electrode 60.

The counter substrate 120 is provided with a transparent insulating substrate 28 such as glass, a transparent resin planarization layer 29, a plurality of colored layers, and an alignment layer which is not illustrated.

The plurality of colored layers include a first colored layer 24a, a second colored layer 24b and a third colored layer 24c formed of organic insulating layers, i.e., resist layers colored in one of red (R), green (G), and blue (B), and a fourth colored layer 27a and a fifth colored layer 27b colored in black.

The first colored layer 24a is arranged in a first color sub-pixel, the second colored layer 24b is arranged in a second color sub-pixel, and the third colored layer 24c is arranged in a third color sub-pixel. The fourth colored layer 27a is a shield layer which is arranged so as to surround the display area 25 for preventing light leak in the frame area. The fifth colored layer 27b is a shield layer which is arranged in the shape of a lattice facing the scanning line 11 and the signal line 12 of the array substrate 110, and prevents the light leak between the pixels PX.

The array substrate 110 and the counter substrate 120 are arranged so that the respective alignment layers counter each other and fixed by seal adhesives 26. A pillar-shaped spacer 22 is arranged between the array substrate 110 and the counter substrate 120. The gap between the array substrate 110 and the counter substrate 120 is uniformly held by the pillar-shaped spacer 22. In this embodiment, the height of the pillar-shaped spacer 22 is arbitrarily controlled in the range of 2 to 6 μm.

The liquid crystal layer 70 is arranged in the area surrounded by the array substrate 110, the counter substrate 120, and the seal adhesive 26.

Polarization plates which are not illustrated are respectively arranged in the faces of the array substrate 110 and the counter substrate 120 opposite to the liquid crystal layer 70 side.

Figure 3:
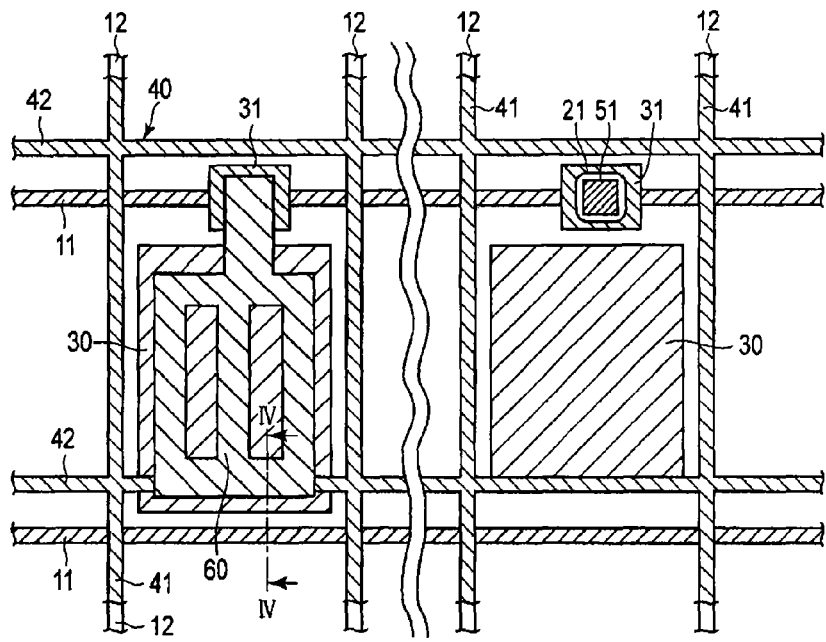
FIG. 3 is a figure schematically showing a structure of a display area of the liquid crystal display device according to the embodiment.

FIG. 3 is a figure schematically showing a structure of the display area 25 of the array substrate 110 according to the embodiment. In addition, FIG. 3 is a view schematically showing one example of a structure in which a portion of the pixel electrode 60 is removed. The common electrode 30 includes a plurality of blocks approximately in the shape of rectangle. The plurality of blocks of the common electrode 30 is pulled out, for example, to outside the display area 25 and electrically connected, or electrically connected in the display area 25. Each block of the common electrode 30 may be arranged in the shape of a matrix so that each block counters each pixel electrodes 60, for example, or may be arranged so that the each block counters with three sub-pixel electrodes 60 arranged in one color pixel.

The sensor electrode 40 is formed in a lattice shape and provided with a first sensor electrode 41, that is, the first electrode for the sensor extending substantially in parallel with the signal line 12, and a second sensor electrode 42, that is, the second electrode for the sensor extending substantially in parallel with the scanning line 11.

According to this embodiment, the first sensor electrode 41 is arranged on the signal line 12 between two adjacent color sub-pixels of the first color sub-pixel, the second color sub-pixel and the third color sub-pixel which constitute one color pixel. FIG. 3 shows the state where the first sensor electrode 41 is arranged on the signal line 12 so as to overlap each other.

A portion of the second sensor electrode 42 is arranged under the pixel electrode 60 as explained later. The second sensor electrode 42 electrically connects the adjacent first sensor electrodes 41 each other in the row direction. The second sensor electrode 42 is arranged in each row line of the plurality of pixels PX, extending in the direction in which the scanning line 11 extends.

The sensor electrode 40 is arranged extending in the frame area, and electrically connected with a sensing circuit (not shown) provided outside. In the liquid crystal display device according to this embodiment, when a contact position is detected, the sensing circuit supplies signals with a predetermined waveform to the sensor electrode 40. According to a distance between the user's fingertip or the nib and the sensor electrode 40, the magnitude of the capacitance produced between the fingertip, etc., and the sensor electrode 40 changes. The sensing circuit detects the change of the potential of the sensor electrode 40 by the change of the capacitance between the fingertip, etc., and the sensor electrode 40 from an output waveform of the signal outputted from the sensor electrode 40, and detects a coordinate position of the sensor electrode 40 corresponding to the position where the user's fingertip, the nib, etc., contacted.

The pixel electrode 60 is equipped with slits 60S mutually extending in parallel. According to this embodiment, the plurality of slits 60S extends substantially in parallel with the direction in which the signal line 12 extends.

The alignment state of the liquid crystal layer 70 is controlled by the electric field produced between the pixel electrode 60 and the common electrode 30. By forming the slit 60S in the pixel electrode 60, also in the central portion of the pixel PX, the electric field is produced between the pixel electrode 60 and the common electrode 30, and it becomes possible to control the alignment state of the liquid crystal layer 70.

Figure 4:
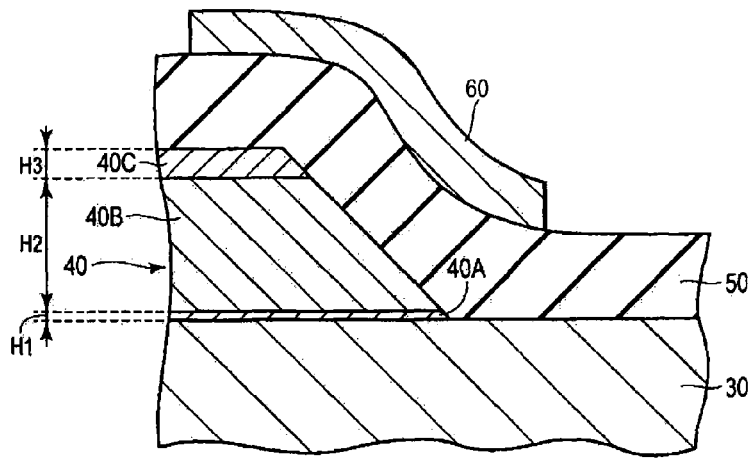
FIG. 4 is a cross-sectional view schematically showing a structure of a sensor electrode of the liquid crystal display device taken along line IV-IV shown in FIG. 3 according to the embodiment.

FIG. 4 is a cross-sectional view schematically showing a structure of a sensor electrode of the liquid crystal display device taken along line IV-IV shown in FIG. 3 according to the embodiment. The sensor electrode 40 is a multilayer electrode in which at least two electric conductive layers are stacked. The sensor electrode 40 includes a first electric conductive layer 40A arranged on the common electrode 30, a second electric conductive layer 40B arranged on the first electric conductive layer 40A, and a third electric conductive layer 40C arranged on the second electric conductive layer 40B. It is necessary that the sensor electrode 40 includes the first electric conductive layer 40A and the second electric conductive layer 40B at least, and the third electric conductive layer 40C can be omitted.

The thickness H1 of the first electric conductive layer 40A is equal to or less than 10% of the thickness H2 of the second electric conductive layer 40B. As for the thickness of the first electric conductive layer 40A, it is preferable that the thickness thereof is equal to or less than 20 nm irrespective of the thickness H2 of the second electric conductive layer 40B.

For example, the first electric conductive layer 40A is formed with molybdenum. The thickness H1 of the first electric conductive layer 40A is approximately 10 nm. The second electric conductive layer 40B is formed of aluminum. The thickness H2 of the second electric conductive layer 40B is approximately 200 nm. The third electric conductive layer 40C is formed with molybdenum. The thickness H3 of the third electric conductive layer 40C is approximately 20 nm.

As mentioned above, when the sensor electrode 40 is formed by stacking the plurality of electric conductive layers, and a patterning process is performed to the stacked electric conductive layers using a wet etching process, it becomes possible to prevent uneven removal of the respective electric conductive layers by specifying the ratio between the thickness H1 of the first electric conductive layer 40A and the thickness H2 of the second electric conductive layer 40B of the sensor electrode 40. Therefore, the end of the sensor electrode 40 becomes a tapered shape, and coverage characteristics of the sensor electrode 40 by the insulating layer 50 does not become worse. Accordingly, it becomes possible to avoid of decrease in the manufacturing yield.

Next, an example of the manufacturing method of the liquid crystal display device according to this embodiment is explained. First, how to manufacture the array substrate 110 is explained. A plurality of array substrates 110 to be cut down respectively later is formed on one transparent insulating substrate 10. By repeating a layer formation process and a patterning process, the switching element 14, the scanning line 11, the signal line 12, the insulating layer L1, and other switching elements and various wirings are formed on the array substrate 110.

Then, the planarization layer 20 made from transparent organic insulating layer is formed by coating, exposing and developing an exposing resist. At this time, the exposing resist is applied all over the display area 25 and the frame area. In this embodiment, a light curing resist is used as the exposing resist. The planarization layer 20 of a predetermined pattern is formed so as to have a contact hole 21 by exposing through an exposure mask and developing the light curing resist.

Transparent electrode material, such as ITO, is formed on the planarization layer 20, and the exposing resist is further formed on the transparent electrode material. A patterning process is carried to form a predetermined pattern of the connection electrode 31 and the common electrode 30 by exposing and developing the exposing resist. Successively, the patterning of the transparent electrode material is carried out by an etching process. The exposing resist is removed, and finally, the connection electrode 31 and the common electrode 30 with the predetermined pattern are formed.

Then, formation of a molybdenum layer, an aluminum layer, and a molybdenum layer is performed on the common electrode 30 one by one. Successively, coating process, exposing process, and developing process of the exposing resist are performed. After that, patterning of the metal layers stacked in order of molybdenum/aluminum/molybdenum is performed by a wet etching process. According to above process, the sensor electrode 40 which is an electrode pattern of the stacked structure formed of aluminum and molybdenum is formed on the respective block electrodes of the common electrode 30.

Here, the reason for using the wet etching process is to avoid damage of the surface of the planarization layer 20 which is formed of the organic insulating layer. That is, if a dry etching process is performed, the surface of the planarization layer 20 gets damaged. For this reason, the wet etching process is chosen as the process of forming the sensor electrode 40. In this embodiment, the etching solution used for the wet etching is a mixed-solution of phosphoric acid, nitric acid, and acetic acid.

Then, an insulating layer 50 with a contact hole 51 is formed by coating, exposing, developing the exposing resist. Then, transparent electrode material such as ITO, is formed on the insulating layer 50, and patterning process is performed so that the pixel electrode 60 has a predetermined pattern provided with slits 60S. After that, an alignment layer in which rubbing processing is performed in a predetermined direction is formed on the surface of the pixel electrode 60.

Figure 5:
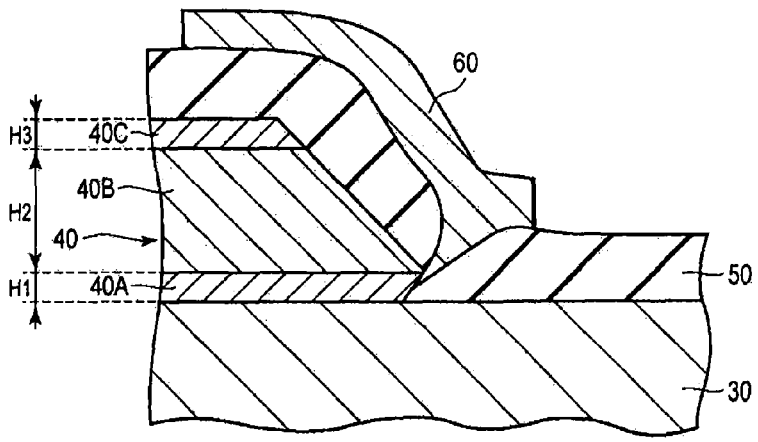
FIG. 5 is a cross-sectional view schematically showing a structure of the sensor electrode of the liquid crystal display device taken along line IV-IV shown in FIG. 3 according to a comparative example.

FIG. 5 is a cross-sectional view schematically showing a structure of the sensor electrode of the liquid crystal display device taken along line IV-IV shown in FIG. 3 according to a comparative example. In the comparative example, the thickness H1 of the first electric conductive layer 40A of the sensor electrode 40 is approximately 50 nm, and the thickness H2 of the second electric conductive layer 40B is approximately 200 nm. The structure of the comparative example is the same as the structure shown in FIG. 4 except this point. The comparative example is explained by denoting the same numerals as the elements corresponding to that shown in FIG. 4.

In the liquid crystal display device according to the comparative example, when forming the sensor electrode 40, if the wet etching process is performed, the first electric conductive layer 40A is removed too much, and the end of the sensor electrode 40 may not become in the tapered shape. In the example shown in FIG. 5, the end of the first electric conductive layer 40A becomes a reverse-tapered shape. Since much etching solution turns around the first electric conductive layer 40A side arranged as the lower layer, the first electric conductive layer 40A is easy to be removed than the second electric conductive layer 40B. Further, the bottom portion of the first electric conductive layer 40A is notably removed because the rate of the thickness H1 of the first electric conductive layer 40A to the thickness H2 of the second electric conductive layer is larger than the rate shown in FIG. 4.

In this case, since the end of the sensor electrode 40 in contact with the common electrode 30 is removed, a boundary portion between the first electric conductive layer 40A and the second electric conductive layer 40B projects, and space is produced under the projected portion.

When an insulating material used for the insulating layer 50 is formed on the sensor electrode 40, the insulating material may break off at the end in which the sensor electrode 40 projects. Accordingly, in the insulating material formed on the end of the sensor electrode 40, a crevice may be produced without being connected.

When the exposing resist (not shown) is coated on the insulating material, similarly, the exposing resist may break off in the portion in which the insulating material breaks off, and a crevice may be produced in the exposing resist.

If the exposing process is performed in this state, exposing light may be irradiated to the insulating material from the crevice in the exposing resist, and thereby the insulating layer 50 may be formed, in which a portion of the insulating material on the end of the sensor electrode 40 is removed.

Then, transparent electrode material such as ITO, is formed on the insulating layer 50, and patterning process is performed so that the pixel electrode 60 is formed in a predetermined pattern provided with the slits 60S. At this time, since the insulating layer 50 is removed on the end of the sensor electrode 40 and a portion of the sensor electrode 40 is exposed, the pixel electrode 60 is formed on sensor electrode 40. Thereby, a short circuit defect is resulted. If the short circuit defect occurs, the accuracy of a touch sensor falls while the display quality falls.

On the other hand, according to this embodiment, since the thickness H1 of the first electric conductive layer 40A is equal to or less than 10% of the thickness H2 of the second electric conductive layer 40B, the end of the first electric conductive layer 40A does not become the reverse taper shape. That is, the end of the sensor electrode 40 becomes the tapered shape. In this embodiment, the thickness H1 of the first electric conductive layer 40A is equal to or less than 20 nm. Therefore, since the insulating layer 50 on the end of the sensor electrode 40 covers the sensor electrode 40 without breaking off, it becomes possible to avoid the generating of the short circuit defect.

Next, how to manufacture the counter substrate 120 is explained. The first colored layer 24a, the second colored layer 24b, the third colored layer 24c, the fourth colored layer 27a, and the fifth colored 27b are formed on the second transparent insulating substrate from which a plurality of counter substrates 120 is cut down in pieces by repeating the coating process, the exposing process and the developing process of the colored resist. Further, the transparent resin planarization layer 29 is formed in a predetermined pattern by coating the transparent resin material used for the transparent resin planarization layer 29 on the plurality of colored layers and patterning the transparent resin material. Then, an alignment layer in which rubbing processing is performed in a predetermined direction is formed on the surface of the transparent resin planarization layer 29.

Pillar-shaped spacers 22 are formed on the first transparent insulating substrate or the second transparent insulating substrate by coating a resin material thereon and patterning the coated resin material in a predetermined pattern.

Then, adhesive 26 consisting of ultraviolet curing resin is coated on the first transparent insulating substrate or the second transparent insulating substrate so that the adhesive 26 surrounds the display area 25. The transparent insulating substrate used for the plurality of array substrates 110 and the transparent insulating substrate used for the plurality of counter substrates 120 are aligned so that the respective alignment layers face each other. After that, the seal adhesive 26 is irradiated with ultraviolet rays to be cured. Thereby, the pair of insulating substrates is fixed.

The liquid crystal material may be injected into the display area 25 from an injecting mouth in which the seal adhesive 26 is partially opened while the liquid crystal material may be dropped in the region surrounded by the seal adhesive 26 to form the liquid crystal layer 70 before attaching the first transparent insulating substrate and the second transparent insulating substrate together. When injecting the liquid crystal material from the injecting mouth, after injecting, the injecting mouth is sealed by a seal agent. When the liquid crystal material is dropped, after dropping, the first transparent insulating substrate and the second transparent insulating substrate are pasted together to form the liquid crystal layer 70.

Then, the pasted first transparent insulating substrate and the second transparent insulating substrate are separated into each pixel by cutting down.

The polarization plate is arranged on the respective surfaces of the array substrate 110 and the counter substrate 120, located opposite to the liquid crystal layer 70 side. The liquid crystal display device is completed.

As mentioned above, according to this embodiment, it can be avoided that the end of the first electric conductive layer 40A of the sensor electrode 40 becomes the reverse tapered shape, and that the insulating layer 50 on the end of the sensor electrode 40 does not break off. Accordingly, the liquid crystal display device can be provided, which can avoid the generating of the short circuit between the sensor electrode 40 and the pixel electrode 60, and improve the manufacturing yield.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

What is claimed is:

1. A liquid crystal display device, comprising:
an array substrate including;
a sensor electrode having an electric conductive oxide layer, a first electric conductive layer arranged on the electric conductive oxide layer and formed of one metal selected from the group consisting of molybdenum (Mo), titanium (Ti), nickel (nickel), and chromium (Cr), and a second electric conductive layer formed of aluminum, and
a plurality of pixel electrodes arranged on the sensor electrode in a matrix shape so as to face the electric conductive oxide layer, each pixel electrode including slits,
a counter substrate facing the array substrate; and
a liquid crystal layer held between the array substrate and the counter substrate;
wherein the thickness of the first electric conductive layer is equal to or less than 10% of the thickness of the second electric conductive layer.

2. The liquid crystal display device according to claim 1, wherein
the array substrate includes a signal line extending in a first direction, a scanning line extending in a second direction orthogonally crossing the first direction, and a switching element arranged in a circumference of a crossing portion of the signal line with the scanning line for switching electrical connection between the signal line and the pixel electrode; and
the sensor electrode includes a first sensor electrode extending in parallel with the signal line and a second sensor electrode extending in parallel with the scanning line.

3. The liquid crystal display device according to claim 1, wherein the sensor electrode further includes a third electric conductive layer arranged on the second electric conductive layer and formed of one metal selected from the group consisting of molybdenum (Mo), titanium (Ti), nickel (nickel), and chromium (Cr).

4. The liquid crystal display device according to claim 1, wherein the sensor electrode is patterned using a wet etching process.

5. The liquid crystal display device according to claim 1, wherein an insulating layer is arranged between the pixel electrode and the sensor electrode.

6. The liquid crystal display device according to claim 1, wherein the electric conductive oxide layer is formed of transparent electrode material.

7. The liquid crystal display device according to claim 6, wherein the transparent electrode material is ITO (Indium Tin Oxide) or IZO (Indium Zinc Oxide).

8. A liquid crystal display device, comprising:
an array substrate including;
a sensor electrode having an electric conductive oxide layer, a first electric conductive layer arranged on the electric conductive oxide layer and formed of one metal selected from the group consisting of molybdenum (Mo), titanium (Ti), nickel (nickel), and chromium (Cr), and a second electric conductive layer formed of aluminum, and a plurality of pixel electrodes arranged on the sensor electrode in a matrix shape so as to face the electric conductive oxide layer, each pixel electrode including slits, a counter substrate facing the array substrate; and a liquid crystal layer held between the array substrate and the counter substrate;

wherein the thickness of the first electric conductive layer is equal to or less than 20 nm.

9. The liquid crystal display device according to claim 8, wherein the array substrate includes a signal line extending in a first direction, a scanning line extending in a second direction orthogonally crossing the first direction, and a switching element arranged in a circumference of crossing a portion of the signal line with the scanning line for switching electrical connection between the signal line and the pixel electrode; and the sensor electrode includes a first sensor electrode extending in parallel with the signal line and a second sensor electrode extending in parallel with the scanning line.

10. The liquid crystal display device according to claim 8, wherein the sensor electrode further includes a third electric conductive layer arranged on the second electric conductive layer and formed of one metal selected from the group consisting of molybdenum (Mo), titanium (Ti), nickel (nickel), and chromium (Cr).

11. The liquid crystal display device according to claim 8, wherein the sensor electrode is patterned using a wet etching process.

12. The liquid crystal display device according to claim 8, wherein an insulating layer is arranged between the pixel electrode and the sensor electrode.

13. The liquid crystal display device according to claim 8, wherein the electric conductive oxide layer is formed of transparent electrode material.

14. The liquid crystal display device according to claim 13, wherein the transparent electrode material is ITO (Indium Tin Oxide) or IZO (Indium Zinc Oxide).

15. A method of manufacturing an array substrate for a liquid crystal display device, comprising the steps:

forming an electric conductive oxide layer on the array substrate;

forming a first electric conductive layer on the electric conductive oxide layer, the first electric conductive layer formed of one metal selected from the group consisting of molybdenum (Mo), titanium (Ti), nickel (nickel), and chromium (Cr);

forming a second electric conductive layer on the first electric conductive layer, the second electric conductive layer formed of aluminum;

patterning the first and second electric conductive layers using a wet etching process, a stacked end of the patterned first and second electric conductive layers having a tapered portion;

forming an insulating layer on the first and second electric conductive layers having the tapered portion; and forming a third electric conductive layer on the insulating layer;

wherein the thickness of the first electric conductive layer is equal to or less than 10% of the thickness of the second electric conductive layer.

16. The method of manufacturing an array substrate for a liquid crystal display device according to claim 15, wherein etching solution used for the wet etching process is a mixed-solution of phosphoric acid, nitric acid, and acetic acid.

* * * * *